(12) United States Patent
Durso

(10) Patent No.: US 6,220,538 B1
(45) Date of Patent: Apr. 24, 2001

(54) ELECTRONIC JIGGING REEL

(76) Inventor: Anthony J. Durso, 1212 Orange Ave., Nederland, TX (US) 77627

( * ) Notice: Subject to any disclaimer, the term of this patent is extended or adjusted under 35 U.S.C. 154(b) by 0 days.

(21) Appl. No.: 09/426,161

(22) Filed: Oct. 22, 1999

(51) Int. Cl.[7] ................................................ A01K 89/017
(52) U.S. Cl. ............................ 242/250; 242/225; 43/17; 43/21; 43/26.1
(58) Field of Search ................................. 242/225, 250, 242/305; 43/21, 24, 20, 17, 26.1

(56) References Cited

U.S. PATENT DOCUMENTS

| | | |
|---|---|---|
| D. 259,503 | 6/1981 | Huffman . |
| 3,365,833 * | 1/1968 | Christiansen . |
| 4,253,165 * | 2/1981 | Christiansen ........................... 43/26.1 |
| 4,378,652 * | 4/1983 | Lindgren .................... 43/21 |
| 4,384,427 * | 5/1983 | Christiansen ........................... 43/26.1 |
| 4,418,491 * | 12/1983 | Christiansen ........................... 43/26.1 |
| 4,598,878 | 7/1986 | Steffan . |
| 4,634,072 | 1/1987 | Stealy . |
| 4,739,944 | 4/1988 | Atwell . |
| 5,004,181 | 4/1991 | Fowles . |
| 5,287,646 * | 2/1994 | Kuhlman ..................... 43/17 |
| 5,400,979 | 3/1995 | Goodman . |
| 5,894,691 * | 4/1999 | Zepeda, Sr. ..................... 43/17 |
| 5,943,808 * | 8/1999 | Bryant ....................... 43/17 |
| 6,012,665 * | 1/2000 | Olona ..................... 242/250 |
| 6,125,573 * | 10/2000 | Wilczynski ..................... 43/17 |

* cited by examiner

*Primary Examiner*—Katherine A. Matecki

(57) ABSTRACT

An electronic jigging reel for providing automatic reeling and jigging of a fishing line. The electronic jigging reel includes a motorized reel operationally coupled to a three position switch for permitting constant motorized reeling, pulsed motorized reeling for jigging the fishing line, and manual reeling. In an embodiment, display lights are provided for indicating the current status of the motorized reel. In an embodiment, a fish bite indicator system having audio and visual bite indicators is also included. In an embodiment, the motor is powered by a rechargeable battery system.

21 Claims, 4 Drawing Sheets

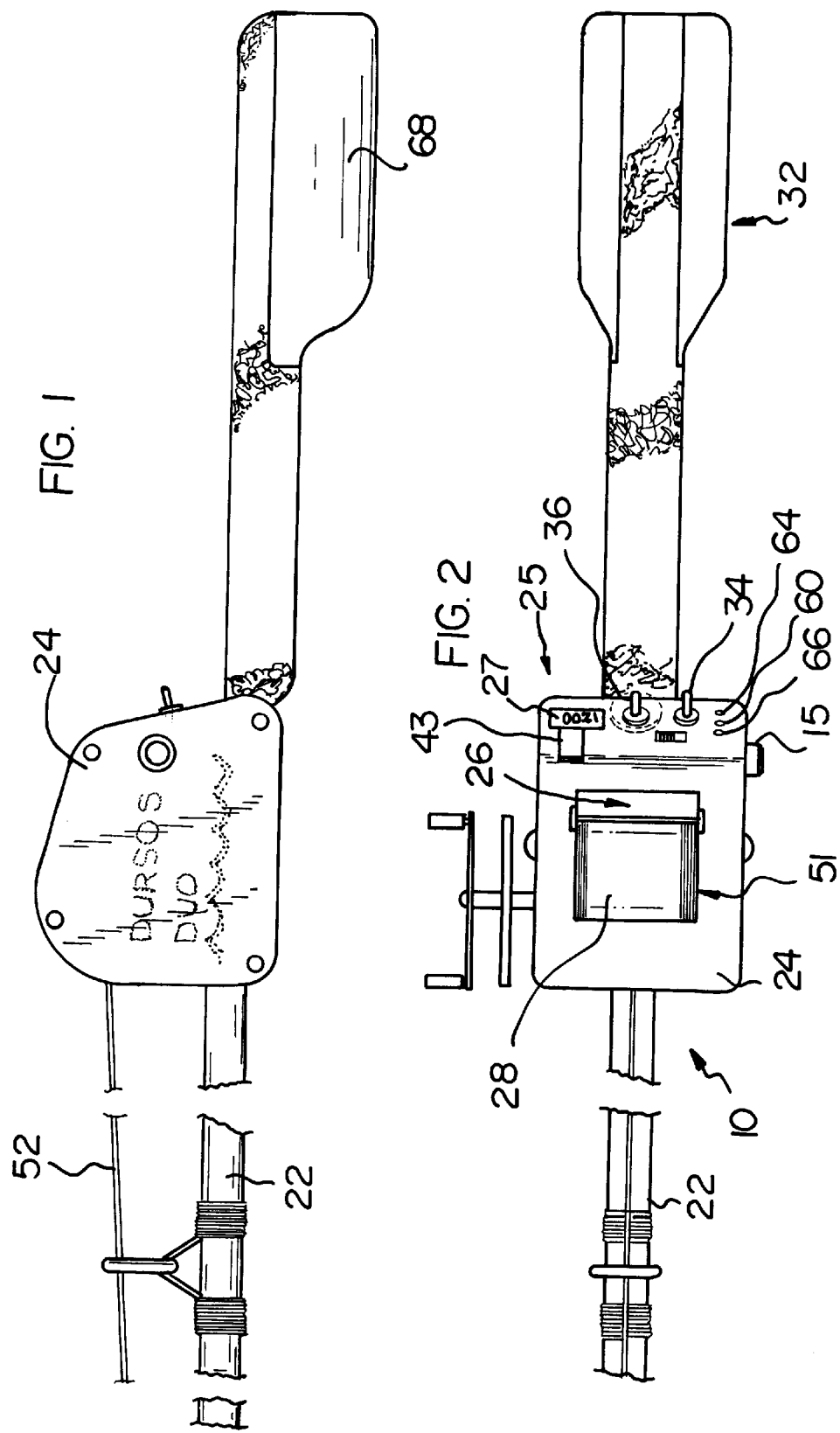

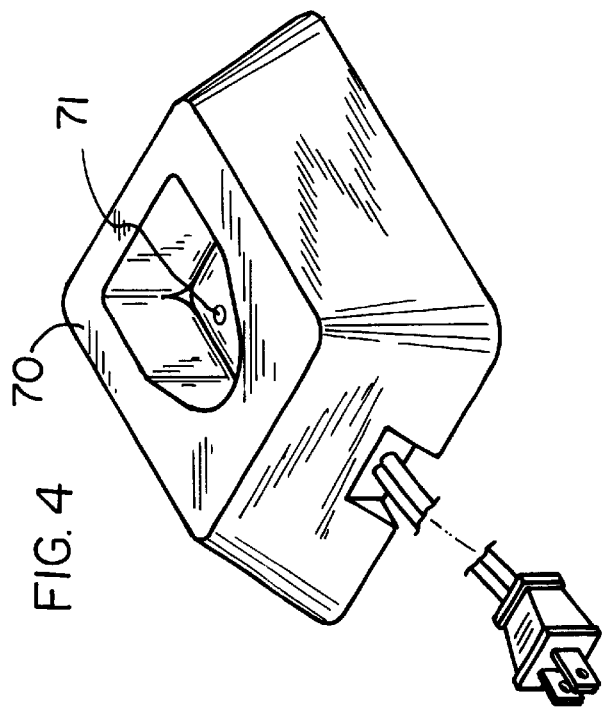
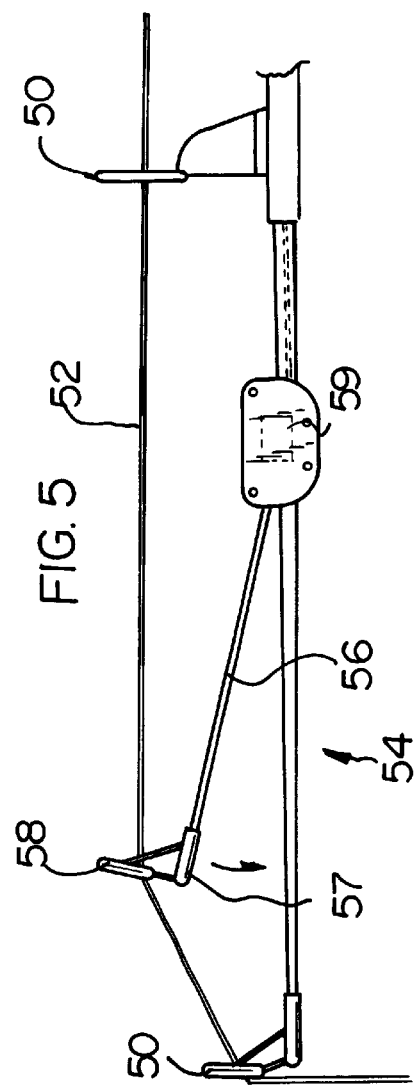
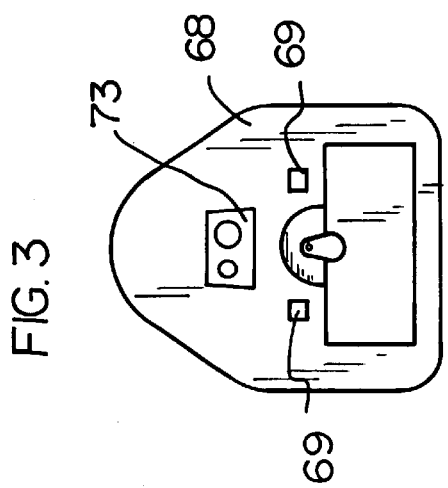

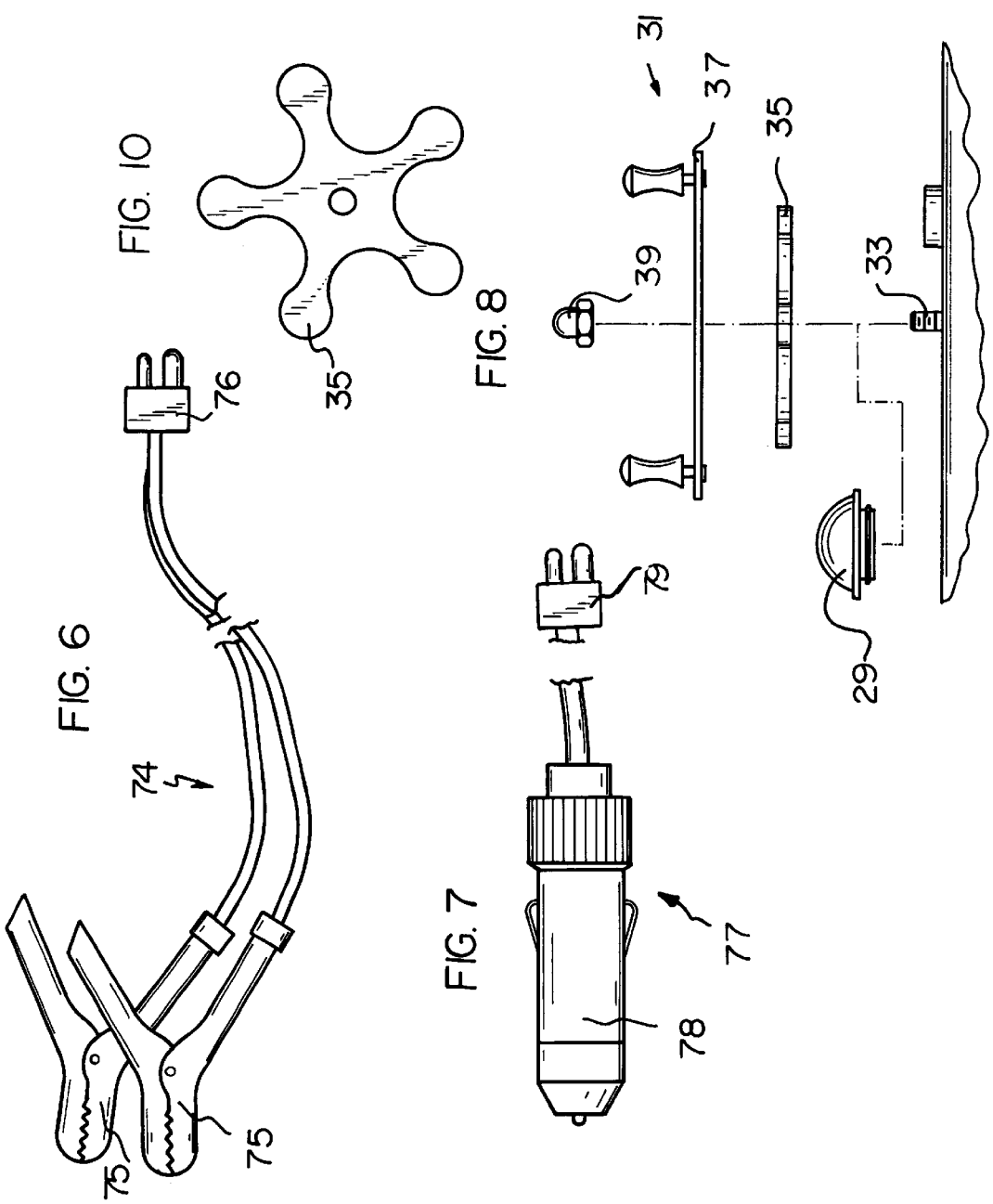

ELECTRONIC JIGGING REEL

BACKGROUND OF THE INVENTION

1. Field of the Invention

The present invention relates to fishing reels and more particularly pertains to a new electronic jigging reel for providing automatic reeling and jigging of a fishing line.

2. Description of the Prior Art

The use of fishing reels is known in the prior art. More specifically, fishing reels heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. 4,739,944; U.S. Pat. No. 5,004,181; U.S. Pat. No. 4,598,878; U.S. Pat. No. 4,634,072; U.S. Pat. No. Des. 259,503; and U.S. Pat. No. 5,400,979.

While these devices fulfill their respective, particular objectives and requirements, the aforementioned patents do not disclose a new electronic jigging reel. The inventive device includes a motorized reel operationally coupled to a three position switch for permitting constant motorized reeling, pulsed motorized reeling for jigging the fishing line, and manual reeling. Display lights are provided for indicating the current status of the motorized reel. In an embodiment, a fish bite indicator system having audio and visual bite indicators is also included. The motor is powered by a rechargeable battery system.

In these respects, the electronic jigging reel according to the present invention substantially departs from the conventional concepts and designs of the prior art, and in so doing provides an apparatus primarily developed for the purpose of providing automatic reeling and jigging of a fishing line.

SUMMARY OF THE INVENTION

In view of the foregoing disadvantages inherent in the known types of fishing reels now present in the prior art, the present invention provides a new electronic jigging reel construction wherein the same can be utilized for providing automatic reeling and jigging of a fishing line.

The general purpose of the present invention, which will be described subsequently in greater detail, is to provide a new electronic jigging reel apparatus and method which has many of the advantages of the fishing reels mentioned heretofore and many novel features that result in a new electronic jigging reel which is not anticipated, rendered obvious, suggested, or even implied by any of the prior art fishing reels, either alone or in any combination thereof.

To attain this, the present invention generally comprises a motorized reel operationally coupled to a three position switch for permitting constant motorized reeling, pulsed motorized reeling for jigging the fishing line, and manual reeling. Display lights are provided for indicating the current status of the motorized reel. In an embodiment, a fish bite indicator system having audio and visual bite indicators is also included. The motor is powered by a rechargeable battery system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electronic jigging reel apparatus and method which has many of the advantages of the fishing reels mentioned heretofore and many novel features that result in a new electronic jigging reel which is not anticipated, rendered obvious, suggested, or even implied by any of the prior art fishing reels, either alone or in any combination thereof.

It is another object of the present invention to provide a new electronic jigging reel that may be easily and efficiently manufactured and marketed.

It is a further object of the present invention to provide a new electronic jigging reel that is of a durable and reliable construction.

An even further object of the present invention is to provide a new electronic jigging reel which is susceptible of a low cost of manufacture with regard to both materials and labor, and which accordingly is then susceptible of low prices of sale to the consuming public, thereby making such electronic jigging reel economically available to the buying public.

Still yet another object of the present invention is to provide a new electronic jigging reel which provides in the apparatuses and methods of the prior art some of the advantages thereof, while simultaneously overcoming some of the disadvantages normally associated therewith.

Still another object of the present invention is to provide a new electronic jigging reel for providing automatic reeling and jigging of a fishing line.

Yet another object of the present invention is to provide a new electronic jigging reel which includes a motorized reel operationally coupled to a three position switch for permitting constant motorized reeling, pulsed motorized reeling for jigging the fishing line, and manual reeling. Display lights are provided for indicating the current status of the motorized reel. In an embodiment, a fish bite indicator system having audio and visual bite indicators is also included. The motor is powered by a rechargeable battery system.

Still yet another object of the present invention is to provide a new electronic jigging reel that provides a removable handle for manual reeling and a cap for covering the handle connector when the handle is not coupled to the reel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new electronic jigging reel according to the present invention.

FIG. 2 is a top view of the present invention.

FIG. 3 is an end view of the battery of the present invention.

FIG. 4 is a perspective view of the base unit of the present invention.

FIG. 5 is a side view of the bite indicating system of the present invention.

FIG. 6 is a side view of the vehicle battery charger of the present invention.

FIG. 7 is a side view of the power tap charger of the present invention.

FIG. 8 is a side view of the removable reel handle system of the present invention.

FIG. 10 is a front view of the drag gear of the present invention.

DESCRIPTION OF THE PREFERRED EMBODIMENT

Figure 9:
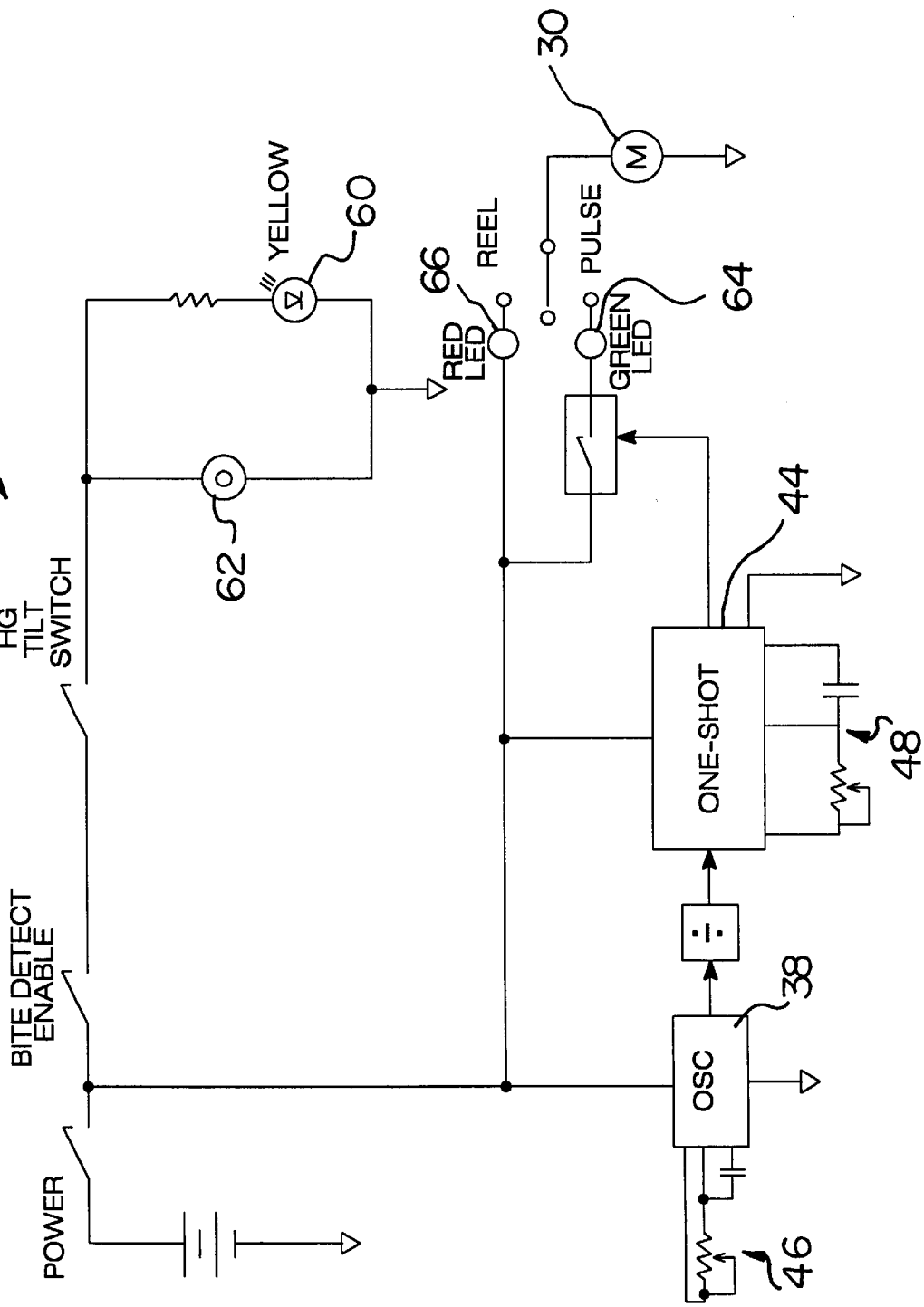
FIG. 9 is a schematic view of the electronic system of the present invention.

With reference now to the drawings, and in particular to FIGS. 1 through 10 thereof, a new electronic jigging reel embodying the principles and concepts of the present invention and generally designated by the reference numeral 10 will be described.

As best illustrated in FIGS. 1 through 10, the electronic jigging reel 10 generally comprises a fishing pole 22, a reel housing 24 including an interior space 26, a reel 28, a motor 30, a power source 32, main power switch 34, operation switch 36, and an oscillator 38.

The reel housing 24 is coupled to the fishing pole 22. The reel 28 is positioned substantially in the interior space 26. The motor 30 is positioned in the interior space, the motor 30 is operationally coupled to the reel 28 for turning the reel 28 upon activation of the motor 30. The power source is connected to the motor 30 for selectively providing power to the motor 30.

The main power switch 34 extends from the reel housing 24 and is operationally coupled to the power source 32 for providing power to the motor 30 when the main power switch 34 is in a closed position.

The operation switch 36 is coupled to the housing near a handle 42 of the fishing pole 20 for facilitating manipulation of the operation switch 36 by a user. The operation switch 36 is wired to the motor 30 and the main power switch 34 for selectively activating the motor 30 when the main power switch 34 is in a closed position. The operation switch 36 includes an on position for activating the motor 30, an off position for deactivating the motor 30, and a jigging position.

The oscillator 38 and the one-shot multi-vibrator 44 is wired to the switch for periodically activating the motor 30 when the switch is in the jigging position whereby the reel 28 provides periodic incremental reeling of a fishing line 52 wrapped around the reel 28 when the switch is in the jigging position.

A first variable RC time constant 46 is electrically coupled to the oscillator 38 for selectively varying the number of times the motor 30 is activated over a pre-determined period of time when the operation switch 36 is in the jigging position and the main power switch 34 is in the closed position.

A second variable RC time constant 48 is electrically coupled to the one-shot multi-vibrator 44 for selectively varying the duration of each activation of the motor 30 when the operation switch 36 is in the jigging position and the main power switch 34 is in the closed position. Thus, the duration of activation of the motor 30 is controllable by the user.

The fishing pole 22 includes a pair of substantially aligned line guides 50 such that the fishing line 52 passes through the line guides 50. The system 10 includes a bite indicator system 54 including a trigger arm 56 substantially aligned with the fishing pole 22 and positioned between the pair of line guides 50. The trigger arm 56 is pivotally coupled to the fishing pole 22 such that a distal end 57 is selectively positionable in offset relationship to a longitudinal axis passing through the line guides 50. An eye 58 is provided on the distal end 57 for receiving the fishing line 52 therethrough such that the fishing line 52 is urged into an offset position with respect to the longitudinal axis extending through the line guides 50 when the trigger arm 56 is in an armed position. The trigger arm 56 is movable into an activated position by a tensile force applied to the fishing line 52 and is operationally coupled to a bite indicator switch 59. The bite indicator switch 59 is for providing a signal upon movement of the trigger arm 56 from the armed position to the activated position.

A bite indicating light emitting diode 60 is operationally coupled to the bite indicator switch 59 for providing a visual signal of movement of the trigger arm 56 between the armed and activated positions. In an embodiment, the diode 60 is colored yellow.

A piezo-electric buzzer 62 is electrically coupled to the bite indicator switch 59 for providing an audio signal upon movement of the trigger arm between the armed and activated positions.

A reel activation light emitting diode 64 is electrically coupled to the operation switch 36 such that the reel activation light emitting diode 64 provides a visual indication of activation of the motor 30 by the operation switch 36. In an embodiment, the reel activation diode 64 is colored green.

A power indicator light emitting diode 66 is electrically coupled to the main power switch 34 such that the power indicator light emitting diode 66 provides a visual indication of the main power switch 34 is in the closed position. In an embodiment, the diode 66 is colored red.

In an embodiment, the power source 32 is a rechargeable battery 68 attachable to an end of the fishing pole 22 near the handle 42.

The battery 68 includes a pair of base connection ports 69 for recharging the battery 68. A base unit 70 is included and has a pair of base recharging ports 71. The battery is selectively engageable to the base unit such that the base connection ports contact the base recharging ports. The base unit is electrically couplable to a power source for recharging the battery when the base connection ports contact the base recharging ports.

The battery 68 also includes a battery recharging port 73. A vehicle battery charger 74 includes a pair of clips 75 designed for engaging a vehicle battery and a charging connection member 76 for selectively coupling to the battery charging port. Thus, the battery is designed for being recharged by the vehicle battery when the clips are engaged to the vehicle battery and the charging connection member is engaged to the battery recharging port.

For an alternate method of recharging the battery 68, a vehicle power tap charger 77 includes a power tap connector 78 designed for engaging a vehicle power tap and a charging connection member 79, having similar structure to charging connection member 76, for selectively coupling to the battery charging port. Thus, the battery is designed for being recharged by the vehicle power tap when the power tap connector is engaged to the vehicle power tap when the charging connection member is engaged to the battery recharging port.

A removable handle system 31 is provided for permitting manual reeling of the fishing line 52. The removable handle system includes a connection member 33 extending outwardly from the housing 22. The connection member 33 is mechanically coupled to the reel 28 for reeling the fishing line 52. A drag gear 35 is couplable to the connection member for adjusting the drag while reeling the fishing line 52. A reel handle 37 is also couplable to the connection member for manually reeling the fishing line 52. A fastening cap 39 is provided for engaging the connection member whereby the handle and the drag gear are engaged to the connection member such that turning of the handle reels the fishing line 52.

An end cap 29 is selectively engageable to the connection member such that the connection member is covered by the end cap 29 when the drag gear and the handle are not engaged to the connection member. Thus permitting operation of the reel 28 using only the operation switch 36.

A clock 27 is positioned substantially within the reel housing and the reel housing 24 includes a clock window 25 positioned proximate the clock for permitting viewing of a time displayed on a face of the clock.

A spool release button 43 is coupled to the reel housing for permitting free spinning of the reel 28 for casting of the fishing line 52.

In an embodiment, the reel housing 24 includes an open upper face 51 facing outwardly from the fishing pole 22 for facilitating visual inspection of the reel 28 and for permitting contact of a thumb of a user with the fishing line 52 during use for facilitating casting of the fishing line.

A pulse adjustment control knob 15 is coupled to the reel housing 24. The pulse adjustment control is coupled to the pulse duration control device for manually adjusting the pulse duration control device to permit longer or shorter periods of activation of the reel during jigging.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing reel system, comprising:

a fishing pole;

a reel housing having an interior space, said reel housing being coupled to said fishing pole;

a reel positioned substantially in said interior space;

a motor positioned in said interior space, said motor being operationally coupled to said reel for turning said reel upon activation of said motor;

a power source for selectively providing power to said motor;

a main power switch extending from said housing, said main power switch being operationally coupled to said power source for providing power to said motor when said main power switch is in a closed position;

an operation switch coupled to said housing, said operation switch being operationally coupled to said motor and said main power switch for selectively activating said motor when said main power switch is in a closed position, said operational switch having an on position for activating said motor, an off position for deactivating said motor, and a jigging position; and an oscillator and a one-shot multi-vibrator operationally coupled to said operation switch for periodically activating said motor when said operation switch is in said jigging position whereby said reel provides periodic incremental reeling of said fishing line when said operation switch is in said jigging position.

2. The fishing reel system of claim 1, further comprising:

a pulse rate control device operationally coupled to said oscillator for selectively varying the number of times the motor is activated over a pre-determined period of time when said operation switch is in the jigging position and said main power switch is in said closed position whereby the frequency of activation of the motor is controllable by a user.

3. The fishing reel system of claim 1, further comprising:

a pulse duration control device operationally coupled to said oscillator for selectively varying the duration of each activation of the motor when said operation switch is in the jigging position and said main power switch is in said closed position whereby the duration of activation of the motor is controllable by the user.

4. The fishing reel system of claim 3, further comprising:

a pulse adjustment control knob coupled to said reel housing, said pulse adjustment control being operationally coupled to said pulse duration control device for manually adjusting said pulse duration control device.

5. The fishing reel system of claim 1, further comprising:

a pair of substantially aligned line guides on said fishing pole, said fishing line passing through said line guides;

a bite indicator system including a trigger arm substantially aligned with said fishing pole and positioned between said pair of line guides, said trigger arm being pivotally coupled to said fishing pole such that a distal end of said trigger arm is selectively positionable in offset relationship to a longitudinal axis passing through said line guides, said trigger arm having an eye at its distal end for receiving said fishing line therethrough such that said fishing line is urged into an offset position with respect to said longitudinal axis extending through said line guides when said trigger arm is in an armed position, said trigger arm being movable into a activated position by a tensile force applied to said fishing line, said trigger arm being operationally coupled to a bite indicator switch, said bite indicator switch for providing a signal upon movement of said trigger arm from said armed position to said activated position.

6. The fishing reel system of claim 5, further comprising:
a bite indicating light emitting diode operationally coupled to said bite indicator switch for providing a visual signal of movement of the trigger arm between the armed and activated positions.

7. The fishing reel system of claim 5, further comprising:
a piezo-electric buzzer operationally coupled to said bite indicator switch for providing an audible signal of movement of the trigger arm between the armed and activated positions.

8. The fishing reel system of claim 1, further comprising:
a reel activation light emitting diode operationally coupled to said operational switch such that said reel activation light emitting diode provides a visual indication of activation of said motor by said operational switch.

9. The fishing reel system of claim 1, further comprising:
a power indicator light emitting diode operationally coupled to said main power switch such that said power indicator light emitting diode provides a visual indication of said main power switch being in said closed position.

10. The fishing reel system of claim 1, wherein:
said power source comprises a rechargeable battery couplable to said fishing pole.

11. The fishing reel system of claim 10, further comprising:
a pair of base connection ports on said battery for recharging said battery; and
a base unit having a pair of base recharging ports, said battery being selectively engageable to said base unit such that said base connection ports contact said base recharging ports, said base unit being couplable to an external power source for recharging said battery when said base connection ports contact said base recharging ports.

12. The fishing reel system of claim 10, further comprising:
a battery recharging port on said battery; and
a vehicle battery charger having a pair of clips adapted for engaging a vehicle battery and a charging connection member for selectively coupling to said battery charging port such that said battery is adapted for being recharged by the vehicle battery when the clips are engaged to the vehicle battery and the charging connection member is engaged to the battery recharging port.

13. The fishing reel system of claim 10, further comprising:

a battery recharging port on said battery; and
a vehicle power tap charger having a power tap connector adapted for engaging a vehicle power tap and a charging connection member for selectively coupling to said battery charging port such that said battery is adapted for being recharged by the vehicle power tap when the power tap connector is engaged to the vehicle power tap and the charging connection member is engaged to the battery recharging port.

14. The fishing reel system of claim 1, further comprising:
a removable handle system for permitting manual reeling of said fishing line, said removable handle system including
a connection member extending outwardly from said reel housing, said connection member being operationally coupled to said reel for reeling said fishing line,
a drag gear couplable to said connection member,
a handle couplable to said connection member,
a fastening cap for engaging said connection member whereby said handle and said drag gear are engaged to said connection member such that turning of said handle reels said fishing line, and
an end cap selectively engageable to said connection member such that said connection member is coverable by said end cap when said drag gear and said handle are not engaged to said connection member for permitting operation of said reel using only said operational switch.

15. The fishing reel system of claim 1, further comprising:
a clock positioned substantially within said housing, said reel housing having a clock window proximate said clock for permitting viewing of a time displayed on a face of said clock.

16. The fishing reel system of claim 1, further comprising:
a spool release button coupled to said housing, said spool release button being operationally coupled to said reel for permitting free spinning of said reel for casting of said fishing line.

17. The fishing reel system of claim 1, further comprising:
said reel housing having an open upper face proximate a pole handle of said fishing pole for facilitating visual inspection of said reel and for permitting contact of a thumb of a user with said fishing line during use for facilitating casting of said fishing line.

18. A fishing reel system, comprising:
a fishing pole;
a reel housing having an interior space, said reel housing being coupled to said fishing pole;
a reel positioned substantially in said interior space;
a motor positioned in said interior space, said motor being operationally coupled to said reel for turning said reel upon activation of said motor;
a power source for selectively providing power to said motor;
a main power switch extending from said housing, said main power switch being operationally coupled to said power source for providing power to said motor when said main power switch is in a closed position;
an operation switch coupled to said housing, said operation switch being operationally coupled to said motor and said main power switch for selectively activating said motor when said main power switch is in a closed position, said operational switch having an on position for activating said motor, an off position for deactivating said motor, and a jigging position;

an oscillator operationally coupled to said operation switch for periodically activating said motor when said operation switch is in said jigging position whereby said reel provides periodic incremental reeling of said fishing line when said operation switch is in said jigging position;

a pulse rate control device operationally coupled to said oscillator for selectively varying the number of times the motor is activated over a pre-determined period of time when said operation switch is in the jigging position and said main power switch is in said closed position whereby the frequency of activation of the motor is controllable by a user;

a pulse duration control device operationally coupled to said oscillator for selectively varying the duration of each activation of the motor when said operation switch is in the jigging position and said main power switch is in said closed position whereby the duration of activation of the motor is controllable by the user;

said fishing pole having a pair of substantially aligned line guides, said fishing line passing through said line guides;

a bite indicator system including a trigger arm substantially aligned with said fishing pole and positioned between said pair of line guides, said trigger arm being pivotally coupled to said fishing pole such that a distal end of said trigger arm is selectively positionable in offset relationship to a longitudinal axis passing through said line guides, said trigger arm having an eye at its distal end for receiving said fishing line therethrough such that said fishing line is urged into an offset position with respect to said longitudinal axis extending through said line guides when said trigger arm is in an armed position, said trigger arm being movable into a activated position by a tensile force applied to said fishing line, said trigger arm being operationally coupled to a bite indicator switch, said bite indicator switch being for providing a signal upon movement of said trigger arm from said armed position to said activated position;

a bite indicating light emitting diode operationally coupled to said bite indicator switch for providing a visual signal of movement of the trigger arm between the armed and activated positions;

a piezo-electric buzzer operationally coupled to said bite indicator switch for providing an audio signal of movement of the trigger arm between the armed and activated positions;

a reel activation light emitting diode operationally coupled to said operational switch such that said reel activation light emitting diode provides a visual indication of activation of said motor by said operational switch;

a power indicator light emitting diode operationally coupled to said main power switch such that said power indicator light emitting diode provides a visual indication of said main power switch being in said closed position;

said power source comprising a rechargeable battery couplable to said fishing pole;

said battery including a pair of base connection ports and a battery recharging port for recharging said battery;

a removable handle system for permitting manual reeling of said fishing line, said removable handle system including a connection member extending outwardly from said housing, said connection member being operationally coupled to said reel for reeling said fishing line, a drag gear couplable to said connection member, a handle couplable to said connection member, a fastening cap for engaging said connection member whereby said handle and said drag gear are engaged to said connection member such that turning of said handle reels said fishing line, and an end cap selectively engageable to said connection member such that said connection member is coverable by said end cap when said drag gear and said handle are not engaged to said connection member for permitting operation of said reel using only said operational switch;

a clock positioned substantially within said housing, said reel housing having a clock window proximate said clock for permitting viewing of a time displayed on a face of said clock;

a spool release button coupled to said housing, said spool release button being operationally coupled to said reel for permitting free spinning of said reel for casting of said fishing line;

said reel housing having an open upper face proximate a pole handle of said fishing pole for facilitating visual inspection of said reel and for permitting contact of a thumb of a user with said fishing line during use for facilitating casting of said fishing line; and a pulse adjustment control knob coupled to said reel housing, said pulse adjustment control being operationally coupled to said pulse duration control device for manually adjusting said pulse duration control device.

19. The fishing reel system of claim 18, further comprising:

a base unit having a pair of base recharging ports, said battery being selectively engageable to said base unit such that said base connection ports contact said base recharging ports, said base unit being couplable to an external power source for recharging said battery when said base connection ports contact said base recharging ports.

20. The fishing reel system of claim 18, further comprising:

a vehicle battery charger having a pair of clips adapted for engaging a vehicle battery and a charging connection member for selectively coupling to said battery recharging port such that said battery is adapted for being recharged by the vehicle battery when the clips are engaged to the vehicle battery and the charging connection member is engaged to the battery recharging port.

21. The fishing reel system of claim 18, further comprising:

a vehicle power tab charger having a power tap connector adapted for engaging a vehicle power tap and a charging connection member for selectively coupling to said battery recharging port such that said battery is adapted for being recharged by the vehicle power tap when the power tap connector is engaged to the vehicle power tap and the charging connection member is engaged to the battery recharging port.

* * * * *